United States Patent [19]

Abe et al.

[11] Patent Number: 4,600,625
[45] Date of Patent: Jul. 15, 1986

[54] OPTICAL INFORMATION RECORDING MEDIUM

[75] Inventors: Michiharu Abe; Hideaki Oba, both of Yokohama, Japan

[73] Assignee: Ricoh Co., Ltd., Tokyo, Japan

[21] Appl. No.: 651,725

[22] Filed: Sep. 18, 1984

Related U.S. Application Data

[63] Continuation-in-part of Ser. No. 547,708, Nov. 1, 1983, abandoned.

[30] Foreign Application Priority Data

Nov. 8, 1982 [JP] Japan .................... 57-194630

[51] Int. Cl.⁴ .............. B32B 3/16; B32B 23/00; B32B 7/02
[52] U.S. Cl. .................... 428/167; 428/199; 428/216; 428/411.1; 428/913; 430/271; 430/495; 430/945; 346/135.1; 346/76 L
[58] Field of Search ............ 428/216, 199, 167; 430/945, 271, 495; 346/135.1, 76 L

[56] References Cited

U.S. PATENT DOCUMENTS

| | | | |
|---|---|---|---|
| 4,415,621 | 11/1983 | Specht et al. | 428/913 |
| 4,460,665 | 7/1984 | Kunikane et al. | 428/201 |
| 4,465,767 | 8/1984 | Oba et al. | 430/945 |

FOREIGN PATENT DOCUMENTS

| | | | |
|---|---|---|---|
| 0024692 | 2/1984 | Japan | 428/913 |
| 0067092 | 4/1984 | Japan | 428/694 |

OTHER PUBLICATIONS

J. Griffiths, Colour & Constitution of Organic Molecules, 1976, pp. 245-250.
Color Index, 3rd Ed., V. 4, 1971, pp. 4438, 4440.

*Primary Examiner*—P. C. Ives
*Attorney, Agent, or Firm*—Flynn, Thiel, Boutell & Tanis

[57] ABSTRACT

An optical information recording medium being capable of writing and reading with laser beam which comprises forming, on a transparent or opaque substrate, a thin film (recording layer) containing a cyanine coloring matter represented by the general formula:

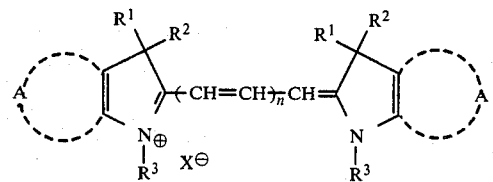

(wherein, $R^1$, $R^2$ and $R^3$ may be the same or different, and each stands for $C_1$-$C_6$ alkyl; X stands for halogen, perhalogenate, boron tetrafluoride, toluenesulfonic acid or alkylsulfonic acid; A stands for a benzene ring or a naphthyl ring and a substituent such as alkyl, alkoxy, hydroxy, carboxyl, halogen, allyl or alkylcarboxyl may be or may be not present on each ring; and n is an integer of 1-3.).

60 Claims, 4 Drawing Figures

OPTICAL INFORMATION RECORDING MEDIUM

This is a continuation-in-part of application Ser. No. 547,708 filed Nov. 1, 1983, now abandoned.

BACKGROUND OF THE INVENTION (a) Field of the Invention

The present invention relates to an optical information recording medium, in particular relates to an optical information recording medium for use in the method (the so-called photodisc method) which records with a high density energy beam such as laser beam and reads by utilizing the variation of a reflected light or a transmitted light of said high density energy beam.

(b) Description of the Prior Art

A great number of optical information recording mediums for use in writing and reading with a high density energy beam (for instance, laser beam) have usually been proposed.

As one typical example of such recording mediums there is known an optical information recording medium which comprises a substrate, a metal reflective film formed thereon, and a coloring matter thin film recording layer (a thin film recording layer containing a coloring matter) formed further thereon. In this recording medium, information write and read are effected by applying condensed laser beam radiation from the side of the recording layer, said laser beam having such a wavelength to which the recording layer exhibits its highest light absorptance.

However, the conventional recording mediums are of the rective type, and therefore are inevitably required to form metal reflective films, being followed by the defect that the construction is complicated. Moreover, the usual recording medium of this type is defective in that it is not sufficient in the recording and reading sensitivities, that the recording medium itself is past endurance to the long term storage and the like.

SUMMARY OF THE INVENTION

The first object of the present invention is to provide an optical information recording medium which is superior in recording and reading sensitivities and moreover high in the C/N ratio (carrier to noise ratio).

The second object of the present invention is to provide a recording medium which is high in storageability.

The third object of the present invention is to provide an optical information recording medium which is available for the transmission type as well as the reflection type, and further of a simple construction.

In order to achieve the above objects, the present inventors have carried out various investigations into a great number of cyanine coloring matters which are absorptive to near infrared rays to find a coloring matter which is superior especially in recording and reading characteristics and storage ability. The present invention has been completed based on the above mentioned finding.

That is, the optical information recording medium according to the present invention is prepared by forming, on the substrate, the thin film (recording layer) containing the cyanine coloring matter represented by the general formula I:

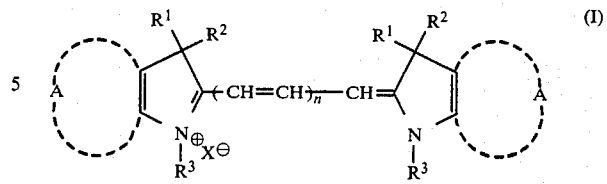

(wherein, $R^1$, $R^2$ and $R^3$ may be the same or different, and each stands for $C_1$–$C_6$ alkyl; X stands for halogen, perhalogenate, boron tetrafluoride, toluenesulfonic acid or alkylsulfuric acid; A stands for a benzene ring or a naphthyl ring and a substituent such as alkyl, alkoxy, hydroxy, carboxyl, halogen, allyl or alkylcarboxyl may be or may be not present on each ring; and n is an integer of 1–3.)

Figure 1:
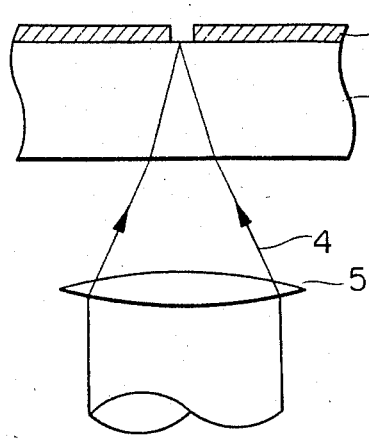
FIG. 1 is a schematic view illustrating the basic structure and the recording or reading method of the optical information recording medium according to the present invention.

In this connection, it is to be noted that in FIG. 1, reference numeral 1 denotes the information recording medium, 2 denotes the substrate, 3 denotes the coloring matter thin film (recording layer), 4 denotes laser beam, and 5 denotes the condensing lens.

DETAILED DESCRIPTION OF THE PREFERRED EMBODIMENTS

The optical information recording medium according to the present invention is basically the one prepared by forming, on the substrate, only the thin film (recording layer) containing said cyanine coloring matter specified above (represented by the general formula I), which can be seen from FIG. 1. In case of necessity, however, it is possible to form a protective layer on said thin film and an adhesive layer under said thin film (namely, between said thin film and the substrate).

In this connection, it is to be noted that by the phrasing "containing said cyanine coloring matter" used herein is meant the single use of the cyanine coloring matter represented by the above mentioned general formula I (which includes the combination of 2 or more cyanine coloring matters represented by the general formula I) or the combination use of this cyanine coloring matter and a different kind of coloring matter or compound.

The cyanine coloring matter used for the present invention, as represented by the abovementioned general formula I, includes two types of the cyanine coloring matters which comprise fusing two pyrrole rings with a benzene ring or a naphthyl ring respectively. In particular, the cyanine coloring matter used for the present invention is characterized by the presence of $C_1$–$C_6$ alkyl group on the 1-position and 3-position of the pyrrole ring. As the examples of said $C_1$-$C_6$ alkyl group, there can be enumerated methyl, ethyl, propyl, butyl, pentyl and hexyl. Among them, methyl or ethyl is especially preferable. A substituent may or may not be present on the benzene ring or the naphthyl ring. And, as the preferable examples of said substituent there can be enumerated $CH_3$, $C_2H_5$, Cl, Br, $CH_3O$, OH, —$CH_2COOH$, —$CH_2CH=CH_2$ and the like. In case two pyrrole rings are bonded by a methine chain, it is especially preferable that said rings be bonded by a heptamethine chain (wherein, n=3). As the examples of the ion bond-forming anion ($X^\ominus$) in the cyanine coloring matter according to the present invention, there can be enumerated $Cl^\ominus$, $Br^\ominus$, $I^\ominus$, $ClO_4^\ominus$, $BF_4^\ominus$, $C_2H_5SO_4^\ominus$, $CH_3SO_4^\ominus$, $CH_3.C_6H_4SO_3^\ominus$ and the like.

Of the above enumerated cyanine coloring matter represented by the general formula I, the especially usable one for the present invention is the one represented by the following general formula II:

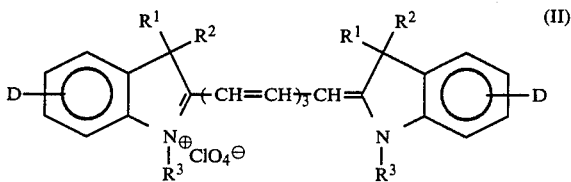

(wherein, $R^1$, $R^2$ and $R^3$ are the same as defined above and D stands for a halogen atom.), and the more especially usable cyanine coloring matter is the one represented by the following general formula III:

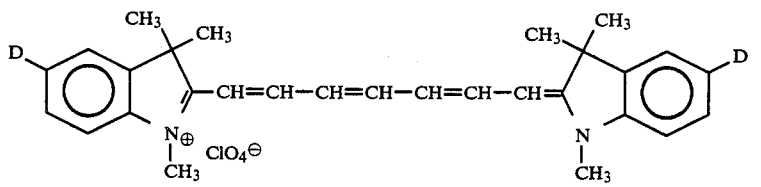

(wherein, D stands for a halogen atom selected from fluorine, chlorine, bromine and iodine.)

The cyanine coloring matter represented by this general formula III is especially superior in thermal resistance and light resistance. Although the reason has not been fully elucidated yet, it may be considered that those superior properties have been caused through the influence of the large ion radius of a counter ion and the electron attractive effect of a halogen on an indole ring.

As the examples of the cyanine coloring matter used for the present invention, the following ones can be enumerated.

1-methyl-2-[7-(1-methyl-3,3-dimethyl-2-indolinylidene)-1,3,5-heptatrienyl]-3,3-dimethyl-indolium chloride,
1-methyl-2-[7-(1-methyl-3,3-dimethyl-2-indolinylidene)-1,3,5-heptatrienyl]-3,3-dimethyl-indolium bromide,
1-methyl-2-[7-(1-methyl-3,3-dimethyl-2-indolinylidene)-1,3,5-heptatrienyl]-3,3-dimethyl-indolium iodide (NK-125 produced by Nihon Kanko Shikiso Kenkyusho),
1-methyl-2-[7-(1-methyl-3,3-dimethyl-2-indolinylidene)-1,3,5-heptatrienyl]-3,3-dimethyl-indolium perchlorate,
1-methyl-2-[7-(1-methyl-3,3-dimethyl-2-indolinylidene)-1,3,5-heptatrienyl]-3,3-dimethyl-indolium p-toluenesulfonate,
1-methyl-2-[7-(1-methyl-3,3-dimethyl-2-indolinylidene)-1,3,5-heptatrienyl]-3,3-dimethyl-indolium tetrafluoroborate,
1-methyl-2-[7-(1-methyl-3,3-dimethyl-2-indolinylidene)-1,3,5-heptatrienyl]-3,3-dimethyl-indolium methylsulfate,
1-methyl-2-[7-(1-methyl-3,3-dimethyl-5-methyl-2-indolinylidene)-1,3,5-heptatrienyl]-3,3-dimethyl-5-methyl-indolium perchlorate,
1-methyl-2-[7-(1-methyl-3,3-diethyl-2-indolinylidene)-1,3,5-heptatrienyl]-3,3-diethyl-indolium perchlorate,
1-methyl-2-[7-(1-methyl-3,3-diethyl-5-methyl-2-indolinylidene)-1,3,5-heptatrienyl]-3,3-diethyl-5-methyl-indolium perchlorate,
1-ethyl-2-[7-(1-ethyl-3,3-dimethyl-2-indolinylidene)-1,3,5-heptatrienyl]-3,3-dimethyl-indolium iodide (NK-1414 produced by Nihon Kanko Shikiso Kenkyusho),
1-ethyl-2-[7-(1-ethyl-3,3-dimethyl-5-methyl-2-indolinylidene)-1,3,5-heptatrienyl]-3,3-dimethyl-5-methyl-indolium methylsulfate,
1-ethyl-2-[7-(1-ethyl-3,3-diethyl-5-methyl-2-indolinylidene)-1,3,5-heptatrienyl]-3,3-diethyl-5-methyl-indolium iodide
1-propyl-2-[7-(1-propyl-3,3-dimethyl-2-indolinylidene)-1,3,5-heptatrienyl]-3,3-dimethyl-indolium perchlorate,
1-propyl-2-[7-(1-propyl-3,3-diethyl-2-indolinylidene)-1,3,5-heptatrienyl]-3,3-diethyl-indolium chloride,
1-propyl-2-[7-(1-propyl-3,3-diethyl-5-methyl-2-indolinylidene)-1,3,5-heptatrienyl]-3,3-diethyl-5-methyl-indolium bromide,
1-n-hexyl-2-[7-(1-n-hexyl-3,3-dimethyl-2-indolinylidene)-1,3,5-heptatrienyl]-3,3-dimethyl-indolium methylsulfate,
1-n-hexyl-2-[7-(1-n-hexyl-3,3-diethyl-2-indolinylidene)-1,3,5-heptatrienyl]-3,3-diethyl-indolium iodide,
1-n-hexyl-2-[7-(1-n-hexyl-3,3-diethyl-5-methyl-2-indolinylidene)-1,3,5-heptatrienyl]-3,3-diethyl-5-methyl-indolium tetrafluoroborate,
1-methyl-2-[7-(1-methyl-3,3-dimethyl-5-methoxy-2-indolinylidene)-1,3,5-heptatrienyl]-3,3-dimethyl-5-methoxy-indolium chloride,
1-methyl-2-[7-(1-methyl-3,3-dimethyl-5-methoxy-2-indolinylidene)-1,3,5-heptatrienyl]-3,3-dimethyl-5-methoxy indolium iodide,
1-methyl-2-[7-(1-methyl-3,3-dimethyl-5-methoxy-2-indolinylidene)-1,3,5-heptatrienyl]-3,3-dimethyl-5-methoxy-indolium perchlorate,
1-ethyl-2-[7-(1-ethyl-3,3-dimethyl-5-methoxy-2-indolinylidene)-1,3,5 -heptatrienyl]-3,3-diethyl-5-methoxy-indolium iodide,
1-ethyl-2-[7-(1-ethyl-3,3-diethyl-5-methoxy-2-indolinylidene)-1,3,5-heptatrienyl]-3,3-diethyl-5-methoxy-indolium p-toluenesulfonate, 1-n-hexyl-2-[7-(1-n-hexyl-3,3-dimethyl-5-methoxy-2-indolinylidene)-1,3,5-heptatrienyl]-3,3-dimethyl-5-methoxy-indolium bromide, 1-n-hexyl-2-[7-(1-n-hexyl-3,3-diethyl-5-methoxy-2-indolinylidene)-1,3,5-heptatrienyl]-3,3-diethyl-5-methoxy-indolium methylsulfate, 1-methyl-2-[7-(1-methyl-3,3-dimethyl-2-benzo[e] indolinylidene)-1,3,5-heptatrienyl]-3,3-dimethyl-benzo[e] indolium chloride, 1-methyl-2-[7-(1-methyl-3,3-dimethyl-2-benzo[e] indolinylidene)-1,3,5-heptatrienyl]-3,3-dimethyl-benzo[e] indolium bromide, 1-methyl-2-[7-(1-methyl-3,3-dimethyl-2-benzo[e] indolinylidene)-1,3,5-heptatrienyl]-3,3-dimethyl-benzo[e] indolium iodide, 1-methyl-2-[7-(1-methyl-3,3-dimethyl-2-benzo[e] indolinylidene)-1,3,5-heptatrienyl]-3,3-dimethyl-benzo[e] indolium perchlorate (NK-2014 produced by Nihon Kanko Shikiso Kenkyusho), 1-methyl-2-[7-(1-methyl-3,3-dimethyl-2-benzol[e] indolinylidene)-1,3,5-heptatrienyl]-3,3-dimethyl-benzo[e] indolium p-toluenesulfonate, 1-methyl-2-[7-(1-methyl-3,3-dimethyl-2-benzo[e] indolinylidene)-1,3,5-heptatrienyl]-3,3-dimethyl-benzo[e] indolium tetrafluoroborate, 1-methyl-2-[7-(1-methyl-3,3-dimethyl-2-benzo[e] iodolinylidene)-1,3,5-heptatrienyl]-3,3-dimethyl-benzo[e] indolium methylsulfate, 1-methyl-2-[7-(1-methyl-3,3-diethyl-2-benzo[e] indolinylidene)-1,3,5-heptatrienyl]-3,3-diethyl-benzo[e] indolium perchlorate, 1-ethyl-2-[7-(1-ethyl-3,3-diethyl-2-benzo[e] indolinylidene)-1,3,5-heptatrienyl]-3,3-diethyl-benzo[e] indolium iodide, 1-propyl-2-[7-(1-propyl-3,3-dimethyl-2-benzo[e] indolinylidene)-1,3,5-heptatrienyl]-3,3-dimethyl-benzo[e] indolium perchlorate, 1-n-hexyl-2-[7-(1-n-hexyl-3,3-dimethyl-2-benzo[e] indolinylidene)-1,3,5-heptatrienyl]-3,3-dimethyl-benzo[e] indolium perchlorate, 1-methyl-2-[7-(1-methyl-3,3-dimethyl-5-acetyl-2-indolinylidene)-1,3,5-heptatrienyl]-3,3-dimethyl-indolium perchlorate, 1-methyl-2-[7-(1-methyl-3,3-dimethyl-7-hydroxy-2-benzo[e] indolinylidene)-1,3,5-heptatrienyl]-3,3-diethyl-7-hydroxy-benzo[e] indolium perchlorate, 1-methyl-2-[7-(1-methyl-3,3-dimethyl-2-indolinylidene)-1,3-pentadienyl]-3,3-dimethyl-indolium iodide, 1-ethyl-2-[7-(1-ethyl-3,3-dimethyl-2-indolinylidene)-1,3-pentadienyl]-3,3-dimethyl-indolium perchlorate, 1-methyl-2-[7-(1-methyl-3,3-dimethyl-2-indolinylidene)-1-propenyl]-3,3-dimethyl-indolium iodide, 1-methyl-2-[7-(1-methyl-3,3-dimethyl-2-benzo[e] indolinylidene)-1,3-pentadienyl]-3,3-dimethyl-benzo[e] indolium perchlorate, 1-methyl-2-[7-(1-methyl-3,3-dimethyl-2-benzo[e] indolinylidene)-1-propenyl]-3,3-dimethyl-benzo[e] indolium iodide.

As the cyanine coloring matter especially usable for the present invention (namely, the cyanine coloring matter represented by the general formula III), there may be enumerated as follows:

1-methyl-2-[7-(1-methyl-3,3-dimethyl-5-chloro-2-indolinylidene)-1,3,5-heptatrienyl]-3,3-dimethyl-5-chloro-indolium perchlorate, 1-methyl-2-[7-(1-methyl-3,3-dimethyl-5-bromo-2-indolinylidene)-1,3,5-heptatrienyl]-3,3-dimethyl-5-bromo-indolium perchlorate, 1-methyl-2-[7-(1-methyl-3,3-dimethyl-5-iodo-2-indolinylidene)-1,3,5-heptatrienyl]-3,3-dimethyl-5-iodo-indolium perchlorate, 1-methyl-2-[7-(1-methyl-3,3-dimethyl-5-fluoro-2-indolinylidene)-1,3,5-heptatrienyl]-3,3-dimethyl-5-fluoro-indolium perchlorate The substrate materials used in the present invention may be those well known to the ordinary worker in this art and may be either transparent or opaque to the laser beam. However, when writing (record) is effected from the substrate side with laser beam, the substrate material used must be transparent to writing laser beam. On the other hand, when writing (record) is effected from the side opposite to the substrate, namely from the surface of the recording layer, there is no necessity that the substrate material used should be transparent to writing laser beam. However, when reading (regeneration) is carried out with a transmitted light, the substrate material must be transparent to reading laser beam, while when reading (regeneration) is carried out with a reflected light, the substrate material may be either transparent or opaque to reading laser beam.

Referring to the quality of the substrate material, there may be employed the supports universally used for recording elements made of glass, quartz, ceramics, plastics, paper, plate-like or foil-like metal and the like. Among them, plastics are especially suitable in the points of safety, improved recording sensitivity, flatness, light weight, workability and the like. The typical plastics include vinyl chloride resin, vinyl acetate resin, acrylic resin, methacrylic resin, polyester resin, nitrocellulose, polyethylene resin, polypropylene resin, polyamide resin, polystyrene resin, polycarbonate resin, epoxy resin and the like.

And, the substrate may be provided with an irregular guide groove as occasion calls.

The information recording medium according to the present invention comprises forming, on said substrate, the recording layer made of the cyanine coloring matter. The recording layer used for the present invention is exceedingly superior in reflectivity, and therefore there is no positive necessity of providing a reflective layer.

The recording layer formed of the cyanine coloring matter per se used for the present invention, as stated above, is rich in reflexibility. Therefore, it is desirable that the recording layer should be formed of the cyanine coloring matter alone in the light of a tendency that addition of a binder and other additives to this recording layer rather deteriorates the reflexibility of the recording layer.

However, it is needless to say that the cyanine coloring matter used for the present invention, if necessary, may be added with another coloring matter (which is limited to a coloring matter which permits recording and reading with laser beam or the like, concretely speaking, a coloring matter which is absorptive to near infrared ray.). If necessary, furthermore, an anti-oxidant such as phenol resin may be added. As said binder, there can be enumerated polyvinyl butyral, cellulose acetate, polyvinyl acetate, acrylic or methacrylic resin, polyester resin, ethylenevinyl acetate copolymer, polyamide resin or the like, but as described above, it is desirable that such binders should not be used.

Coating of the recording layer may be done by dissolving said cyanine coloring matter or said cyanine coloring matter and additive and the like in an organic solvent (methanol, methylene dichloride, 1,2-dichloroethane or the like), and coating the surface of the substrate with the resulting solution by using the known methods such as spray, roller coating, dipping and spinning.

Of these coating methods, spinning is most preferable.

The vapordeposition method is unable to form the recording layer. The reason is that when using the vapordeposition method, the structure of cyanine coloring matter is thermally destroyed.

The thickness of the recording layer is in the range of 100–1000 Å preferably 300–600 Å, more preferably 300–500Å. When the recording layer contains optional components (which include coloring matters other than those represented by said general formula and additives such as binder, antioxidant and the like) in addition to the cyanine coloring matter used for the present invention, the amounts of said optional components preferably should be restricted to about 90 wt. % of the total amount of the recording layer.

The adhesive layer (undercoat layer), as stated above, is provided between the substrate and the recording layer as occasion demands. This layer may be formed of a heat insulating resin material or an inorganic material, from the viewpoint of its thermal conductivity, by usual means of vapor deposition, coating and the like.

As the resins used herein there can be enumerated vinyl chloride resih, vinyl acetate resin, acrylic or methacrylic resin, polyester such as polyethylene terephthalate, celluloses such as nitro-cellulose, polyamide, polycarbonate, epoxy resin, polyimide, polysulfone, and the like. And, as the inorganic compounds used herein there can be enumerated SiO, $SiO_2$, $TiO_2$ and the like. The use of polyimide and polysulfone is particularly preferable. The thickness of the adhesive layer is in the range of about 0.05 to 10 μm, preferably in the range of about 0.1 to 0.5 μm.

The protective layer, as stated above, is formed on the recording layer as occasion demands.

This layer may be formed by using the usual method of vapor deposition, coating or the like, and its thickness is suitably in the range of about 0.1 to 10 μm, preferably in the range of about 0.5 to 1.0 μm. The materials used in the formation of the protective layer may be either organic or inorganic so far as the thin recording layer is protected thereby.

The concrete examples of organic materials are disclosed in Japanese Laid Open Patent Application No. 96716/1974 Specification, Japanese Laid Open Patent Application No. 59626/1976 Specification, Japanese Laid Open Patent Application No. 75523/1976 Specification, Japanese Laid Open Patent Application No. 88024/1976 Specification, Japanese Laid Open Patent Application No. 134633/1976 Specification and the like. Among them, polystyrene, polyethylene terephthalate and ethylene-vinyl acetate copolymer are used profitably. As the concrete examples of inorganic materials, on the other hand, there may be enumerated $Al_2O_3$, $SiO_2$, SiO, MgO, ZnO, $MgF_2$, $CuF_2$ and the like.

Next, the recording/reading method using the optical information recording medium according to the present invention will be explained. For convenience' sake, here will be used an information recording medium 1 which comprises a substrate 2 and a recording layer (a thin film containing the cyanine coloring matter represented by said general formula) 3 formed on said substrate.

Recording and reading (regenerating) are conducted by condensing laser beam 4 into a size of 1–2 μm on a coloring matter film 3 by means of a condensing lens 5. The recording or regenerating beam may be radiated from the side of the coloring matter film 3, but in case the substrate 2 is transparent, it is advantageous to radiate said beam from the side of the substrate 2 because said radiation is little influenced by dust.

Information record is conducted by pit-formation on the coloring matter film 3 due to the thermal operation of laser beam.

Information read is conducted (i) by detecting the difference between the lights reflected from the pit formed portion and the non-pit formed portion or (ii) by detecting the difference between the lights transmitted through the pit formed portion and the non-pit formed portion. The former (i) relates to the instance of using the information recording medium of the present invention as that of reflection type, and the latter (ii) relates to the instance of using said medium as that of transmission type. In this connection, it is to be noted that when using the information recording medium as the transmission type, the substrate 2 must be transparent.

The laser beam applied to the information recording medium according to the present invention must be selected depending upon the wavelength to which the coloring matter used is absorptive. But, it is preferable to select comparatively cheap He-Ne laser or semiconductor laser.

As described above, the information recording medium 1 according to the present invention is basically comprised of the substrate 2 and the specific cyanine coloring matter thin film (recording layer) 3 formed on the substrate. However, as its modification, an information recording medium, although not shown, which comprises disposing two pieces of recording medium 1,1 with coloring matter thin films 3,3 facing each other, through a spacer or not through a spacer, is also considered. The thus obtained recording medium is exceedingly improved in preservability because the coloring matter thin film 3 can be shut off from the air and can be protected from the undesirable problems of dust-sticking, injuring and contacting with harmful gases. At this time, there is no possibility that recorded information be damaged by a physical/chemical operation, becuase the coloring matter thin film 3 is protected by the substrate 2.

The recording medium according to the present invention is superior especially in preservability, while maintaining the sensitivity and the C/N in high degrees, which will become evident from Examples and Comparative Examples referred to afterwards. And, when the optical information recording medium of the present invention is utilized as the reflection type one, its availability is emphasized much more.

EXAMPLES

Examples 1-11 and Comparative Examples 1 and 2

An information recording medium was prepared by dissolving each cyanine coloring matter represented by each structural formula in the following table in a predetermined solvent, applying this solution onto a predetermined substrate (thickness: 1 mm) so as to have a predetermined thickness by means of a rotary coating machine, and drying.

The light resistance life of each of the thus prepared information recording mediums was expressed by a value obtained when said medium was stored at a place where the amount of radiation light is 1/100 of that in the openair, namely a number of years required until the optical density faded to 50% of the initial value. In the fading test, there was employed the accelerated test method of radiating a tungsten light (54000 lux) under the condition of $35 \pm 3°$ C.

The light resistance of each information recording medium was measured by the accelerated test method (120° C.) and was expressed in terms of relative thermal deposition ratio. In other words, the fading speed of each information recording medium obtained by the accelerated test (120° C.) was expressed as a relative value to the fading speed of the recording medium of Example 1 which was regarded as 1.0.

The thus obtained results are summarized in the following table.

In this connection, it is to be noted that in the table, the larger the light resistance life value is, the more desirable, while the smaller the relative thermal deposition ratio value is, the more desirable.

| | Cyanine coloring matter (trade name*) | Coloring matter thin film thickness (Å) | Substrate | Solvent | Spectral characteristics λmax (nm) (Solution) | Thin film (wavelength 800 nm) Absorption rate (%) | Thin film (wavelength 800 nm) Reflection rate (%) | Light resistance life (year) | Relative thermal decomposition ratio |
|---|---|---|---|---|---|---|---|---|---|
| Example 1 | (NK-2014) | 520 | acryl resin** | dichloroethane | 780 | 61 | 29 | 5 | 1.0 |
| Example 2 | (NK-125) | 480 | acryl resin** | ethyl alcohol | 745 | 55 | 32 | 10 | 10.8 |
| Example 3 | (NK-1414) | 450 | glass | dichloroethane | 742 | 53 | 36 | 8 | 11.7 |
| Example 4 | Mixture of NK-2014 (3 parts) and (1 part) | 570 | acryl resin** | dichloroethane | 780 | 60 | 30 | 5.5 | 1.9 |

-continued

| Cyanine coloring matter (trade name*) | | Coloring matter thin film | | Spectral characteristics | | | | Light resistance life (year) | Relative thermal decomposition ratio |
|---|---|---|---|---|---|---|---|---|---|
| | Solvent | thickness (Å) | Substrate | λmax (nm) (Solution) | Thin film (wavelength 800 nm) | | | | |
| | | | | | Absorption rate (%) | Reflection rate (%) | | | |
| Example 5 | (structure with CH₃O, OCH₃ groups; N⊕—CH₃ ClO₄⊖) (NK-529) | dichloro ethane | 500 | acryl resin** | 750 | 60 | 30 | 8 | 2.0 |
| Example 6 | (structure with Cl, Cl substituents; N⊕—CH₃ ClO₄⊖) | dichloro ethane | 450 | acryl resin** | 750 | 56 | 29 | 14 | 0.7 |
| Example 7 | (structure with Br, Br substituents; N⊕—CH₃ ClO₄⊖) | ethyl alcohol | 400 | acryl resin** | 750 | 53 | 30 | 13 | 0.8 |
| Example 8 | (structure with I, I substituents; N⊕—CH₃ ClO₄⊖) | ethyl alcohol | 420 | polycarbonate resin*** | 750 | 56 | 28 | 13.5 | 0.8 |

-continued

| | Cyanine coloring matter (trade name*) | Solvent | Coloring matter thin film thickness (Å) | Substrate | Spectral characteristics | | | | Light resistance life (year) | Relative thermal decomposition ratio |
|---|---|---|---|---|---|---|---|---|---|---|
| | | | | | λmax (nm) (Solution) | Thin film (wavelength 800 nm) | | | | |
| | | | | | | Absorption rate (%) | Reflection rate (%) | | | |
| Example 9 | [structure: bis(4-chlorophenyl/CH3) indolenine cyanine with CH3-C6H4-SO3⁻] | ethyl alcohol | 520 | acryl resin** | 750 | 59 | 28 | | 10 | 0.9 |
| Example 10 | [structure: bis(4-bromophenyl/CH3) indolenine cyanine with C2H5SO4⁻] | ethyl alcohol | 430 | polycarbonate resin*** | 750 | 52 | 27 | | 9.5 | 0.9 |
| Example 11 | [structure: bis(methylphenyl/CH3) indolenine cyanine with ClO4⁻] | dichloro ethane | 460 | glass | 760 | 56 | 30 | | 8.3 | 1.1 |
| Comparative Example 1 | [structure: benzothiazole cyanine with I⁻] (NK-1958) | ethyl alcohol | 480 | acryl resin** | 760 | 46 | 19 | | 1.5 | 15.3 |
| Comparative Example 2 | [structure: benzoxazole cyanine with I⁻] (NK-1511) | dichloro methane | 520 | acryl resin** | 695 | 30 | 34 | | 0.8 | 25.0 |

*Produced by Nihon Kanko Shikiso Kenkyusho
**As the acryl resin there was used "ACRYRITE" produced by Mitsubishi Rayon K.K.
***As the poly-carbonate resin there was used "DIALITE" produced by Mitsubishi Rayon K.K.

Figure 2:
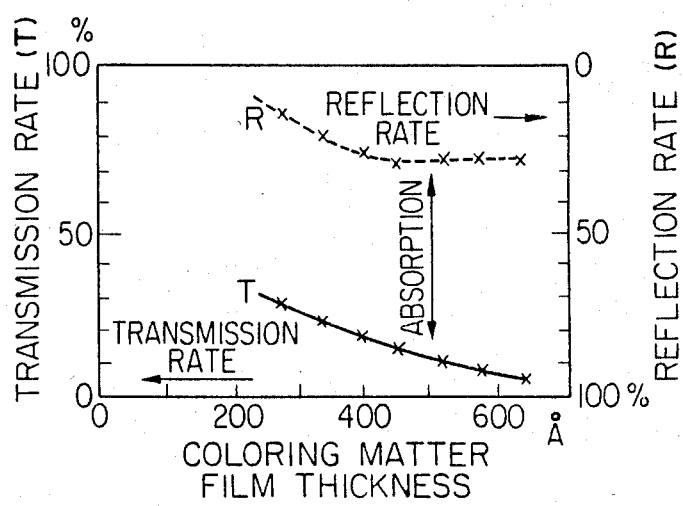
FIG. 2 is a graph illustrating the relationship between the film thickness and the optical characteristic (at wavelength 800 nm) of the coloring matter according to the present invention.
Figure 3:
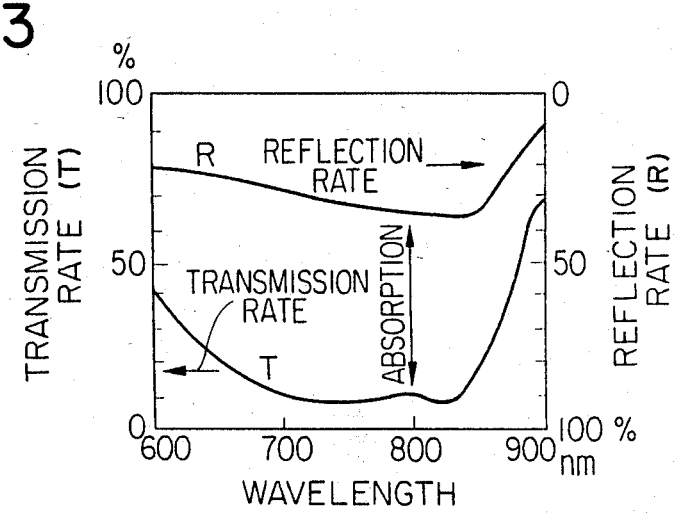
FIG. 3 is a graph illustrating the relationship between the coloring matter film thickness (520 Å) and the wavelength reliability of optical characteristics.
Figure 4:
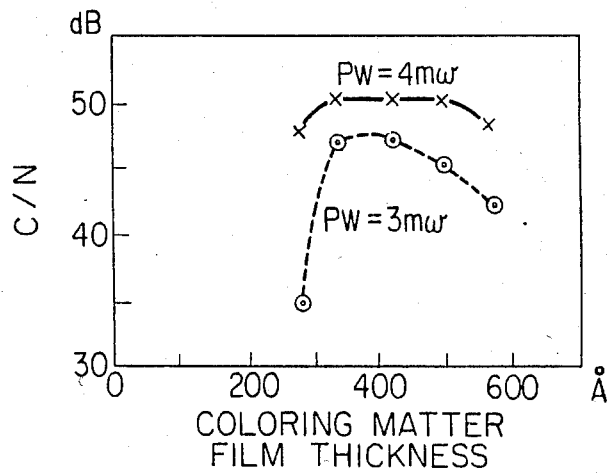
FIG. 4 is a graph illustrating the relationship between the coloring matter film thickness and the C/N ratio (Pw = recording laser power).

By using the cyanine coloring matter of Example 1, then, there were shown the respective relations between the thickness of said cyanine coloring matter film and the optical characteristics, wavelength dependency and the C/N in FIG. 2, FIG. 3 and FIG. 4.

As shown in FIG. 2, when the film thickness is 350 Å or more, there can be obtained the reflection rate of 20% or more and the absorption rate of 60% or more. It can be seen clearly therefrom that said optical information recording medium exhibits satisfactory optical characteristics as the reflection type medium. As shown in FIG. 3, furthermore, when the coloring matter film thickness is 520 Å, it can be seen that said medium exhibits high reflection rate and absorption rate. This shows that this recording medium is suitable especially for GaAlAs semi-conductor laser beam. Still further, this recording medium was recorded by exposure to the semi-conductor laser beam (wavelength: 790 nm) stopped down to 1.54 μm and under the conditions: recording frequency 0.6875 MHz and pit distance 1.8 μm (pit length 0.9 μm) and regenerated. This regenerated signal was subjected to spectral analysis at the scanning filter band width of 30 KHz by means of Tracking Scope TR4110 manufactured by Takeda Riken. The obtained data are shown in FIG. 4. As seen therefrom, in the case of the recording laser power is 4 mW, the C/N 45 dB or more was obtained in the range of thickness of 270 Å–570 Å, and when the film thickness is 320 Å–500 Å, the C/N obtained was 50 dB.

In this connection, it is to be noted that the measured results shown in the above FIG. 2-FIG. 4 are related to the case of using 1-methyl-2-[7-(1-methyl-3,3-dimethyl-2-benzo[e]indolinylidene)-1,3,5-heptatrienyl]-3,3-dimethyl-benzo[e] indolium perchlorate. Accordingly, these measured results themselves are not always applicable to the other cyanine coloring matters. However, it may be seen from the spectral characteristic values in the above table that the cyanine coloring matters represented by the aforesaid general formula are of substantially the same performances.

In view of this, the thickness of the recording layer, as stated previously, is suitably 1000 Å or less, irrespective of the binder and the like being contained in the recording layer. Needless to say, the thickness of the recording layer may be changed suitably so as to meet the demands that the obtained information recording medium should be made into a reflection type or transmission type, or what degree of reflection rate or absorption rate should be attained.

EXAMLE 12

A solution containing NK-2016 and polyvinyl butyral in the ratio of 100:20 (parts by weight) respectively was applied onto an acrylic substrate (ACRYRITE produced by Mitsubishi Rayon K. K.) by the rotating coating and dried to obtain a recording layer having a film thickness of 450 Å.

The absorption rate and the reflection rate of this recording layer at wavelength 800 nm were 52% and 26% respectively. The obtained C/N was 47 dB. The light resistance life (measured according to the same test procedures as Example 1) of the thus prepared optical information medium was 5 years.

EXAMPLE 13

An information recording medium was prepared by forming, on an acrylic substrate, an undercoat layer which was made of a photo-setting acrylic resin and provided at its upper part with guide grooves, the average thickness of the undercoat layer being about 100 μm, further by forming the same recording layer as Example 1 on said undercoat layer. The thus prepared recording element was found to have the same performance as that of Example 1 exhibited.

We claim:

1. An optical information recording medium which comprises a substrate and a recording layer on said substrate, said recording medium being free of a reflective metal layer, said recording layer being a monolayer consisting essentially of cyanine dye having the formula;

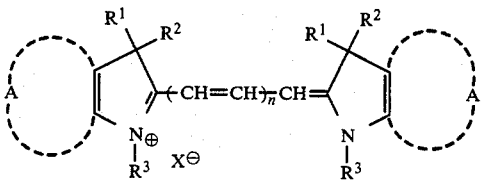

wherein $R^1$, $R^2$ and $R^3$ can be the same or different, and each is alkyl having 1 to 6 carbon atoms; X is halogen, perhalogenate, boron tetrafluoride, toluenesulfonic acid or alkylsulfonic acid; A is phenylene, substituted phenylene, naphthylene or substituted naphthylene, wherein the substituent on said substituted phenylene and naphthylene is selected from the group consisting of alkyl, alkoxy, hydroxy, carboxyl, halogen, allyl or alkylcarboxyl; and n is an integer of 1–3 or a mixture of said cyanine dye with another coloring material which absorbs radiation of near infra-red wavelength.

2. A recording medium according to claim 1 wherein said recording layer consists of said cyanine dye.

3. A recording medium according to claim 1 wherein said recording layer consists essentially of said cyanine dye and an antioxidant.

4. A recording medium according to claim 1 wherein said recording layer does not contain a binder.

5. A recording medium according to claim 1 wherein said recording layer is 100–1000 Å thick.

6. A recording medium according to claim 1 wherein said recording layer is formed by the rotary coating method.

7. A recording medium according to claim 1 wherein the recording layer is formed by the spin coating method.

8. A recording medium according to claim 1 wherein said substrate is transparent to a write laser beam.

9. A recording medium according to claim 1 wherein said substrate is made of a synthetic resin.

10. A recording medium according to claim 1 wherein said substrate is made of an acrylic resin.

11. A recording medium according to claim 1 wherein said substrate is made of polycarbonate.

12. A recording medium according to claim 1 wherein said substrate has an irregular guide groove.

13. A recording medium according to claim 1 wherein an adhesive layer is provided between said recording layer and said substrate.

14. A recording medium according to claim 13 wherein said adhesive layer is formed of an insulating resin material.

15. A recording medium according to claim 13 wherein said adhesive layer is formed of an acrylic resin.

16. A recording medium according to claim 13 wherein said adhesive layer is about 0.05–10 μm thick.

17. A recording medium according to claim 13 wherein the adhesive layer is about 0.1–0.5 μm thick.

18. A recording medium according to claim 1 wherein a protective layer is further formed on said recording layer.

19. A recording medium according to claim 18 wherein said protective layer is 0.1–10 μm thick.

20. A recording medium according to claim 18 wherein the protective layer is 0.5–1.0 μm thick.

21. An optical information recording medium as claimed in claim 1 in which n is 3, A is phenylene substituted with halogen, and X is $ClO_4$.

22. A recording medium according to claim 21 wherein said recording layer consists of said cyanine dye.

23. A recording medium according to claim 21 wherein said recording layer consists essentially of said cyanine dye and an antioxidant.

24. A recording medium according to claim 21 wherein said recording layer does not contain a binder.

25. A recording medium according to claim 21 wherein said recording layer is 100–1000 Å thick.

26. A recording medium according to claim 21 wherein said recording layer is formed by the rotary coating method.

27. A recording medium according to claim 21 wherein the recording layer is formed by the spin coating method.

28. A recording medium according to claim 21 wherein said substrate is transparent to a write laser beam.

29. A recording medium according to claim 21 wherein said substrate is made of a synthetic resin.

30. A recording medium according to claim 21 wherein said substrate is made of an acrylic resin.

31. A recording medium according to claim 21 wherein said substrate is made of polycarbonate.

32. A recording medium according to claim 21 wherein said substrate has an irregular guide groove.

33. A recording medium according to claim 21 wherein an adhesive layer is provided between said recording layer and said substrate.

34. A recording medium according to claim 33 wherein said adhesive layer is formed of an insulating resin material.

35. A recording medium according to claim 33 wherein said adhesive layer is formed of an acrylic resin.

36. A recording medium according to claim 33 wherein said adhesive layer is about 0.05–10 μm thick.

37. A recording medium according to claim 33 wherein the adhesive layer is about 0.1–0.5 μm thick.

38. A recording medium according to claim 21 wherein a protective layer is further formed on said recording layer.

39. A recording medium according to claim 48 wherein said protective layer is 0.1–10 μm thick.

40. A recording medium according to claim 38 wherein the protective layer is 0.5–1.0 μm thick.

41. An optical information recording medium as claimed in claim 21 wherein each of $R^1$, $R^2$ and $R^3$ is methyl.

42. A recording medium according to claim 41 wherein said recording layer consists of said cyanine dye.

43. A recording medium according to claim 41 wherein said recording layer consists essentially of said cyanine dye and an antioxidant.

44. A recording medium according to claim 41 wherein said recording layer does not contain a binder.

45. A recording medium according to claim 41 wherein said recording layer is 100–1000 Å thick.

46. A recording medium according to claim 41 wherein said recording layer is formed by the rotary coating method.

47. A recording medium according to claim 41 wherein the recording layer is formed by the spin coating method.

48. A recording medium according to claim 41 wherein said substrate is transparent to a write laser beam.

49. A recording medium according to claim 41 wherein said substrate is made of a synthetic resin.

50. A recording medium according to claim 41 wherein said substrate is made of an acrylic resin.

51. A recording medium according to claim 41 wherein said substrate is made of polycarbonate.

52. A recording medium according to claim 41 wherein said substrate has an irregular guide groove.

53. A recording medium according to claim 41 wherein an adhesive layer is provided between said recording layer and said substrate.

54. A recording medium according to claim 53 wherein said adhesive layer is formed of an insulating resin material.

55. A recording medium according to claim 53 wherein said adhesive layer is formed of an acrylic resin.

56. A recording medium according to claim 53 wherein said adhesive layer is about 0.05–10 μm thick.

57. A recording medium according to claim 53 wherein the adhesive layer is about 0.1–0.5 μm thick.

58. A recording medium according to claim 41 wherein a protective layer is further formed on said recording layer.

59. A recording medium according to claim 58 wherein said protective layer is 0.1–10 μm thick.

60. A recording medium according to claim 58 wherein the protective layer is 0.5–1.0 μm thick.

* * * * *

UNITED STATES PATENT AND TRADEMARK OFFICE
CERTIFICATE OF CORRECTION

PATENT NO.  :  4 600 625
DATED       :  July 15, 1986
INVENTOR(S) :  Michiharu ABE et al It is certified that error appears in the above-identified patent and that said Letters Patent is hereby corrected as shown below:

Column 20, line 4; change "claim 48" to ---claim 38---.

Signed and Sealed this

Third Day of February, 1987

Attest:

DONALD J. QUIGG

Attesting Officer

Commissioner of Patents and Trademarks